United States Patent

[11] 3,613,820

| [72] | Inventor | Michael Bozoian<br>Ann Arbor, Mich. |
|---|---|---|
| [21] | Appl. No. | 853,905 |
| [22] | Filed | Aug. 28, 1969 |
| [45] | Patented | Oct. 19, 1971 |
| [73] | Assignee | Ford Motor Company<br>Dearborn, Mich. |

[54] ELECTRONIC CIRCUITRY FOR VEHICLE SPEED RESPONSIVE SYSTEM
4 Claims, 3 Drawing Figs.

| [52] | U.S. Cl. | 180/105, 317/5 |
|---|---|---|
| [51] | Int. Cl. | B60k 31/00 |
| [50] | Field of Search | 180/105–109, 103; 340/263, 264; 123/102; 246/182; 303/21; 317/5 |

[56] References Cited
UNITED STATES PATENTS

| 3,060,602 | 10/1962 | Buttenhoff | 180/105 X |
| 3,201,648 | 8/1965 | Kerr | 317/5 |
| 3,406,775 | 10/1968 | Magnuski | 123/102 X |
| 3,455,411 | 7/1969 | Carp et al. | 180/105 |
| 3,517,260 | 6/1970 | Oishi | 123/102 |

*Primary Examiner*—Kenneth H. Betts
*Attorneys*—John R. Faulkner and Glenn S. Arendsen ABSTRACT: Electronic circuitry coupled to an alternating signal generator driven by a vehicle wheel converts the alternating signal into a voltage that is proportional to vehicle speed. When the voltage reaches a predetermined value, the circuitry produces a signal that actuates an item of vehicle equipment. A voltage reference diode compensates the electronic circuitry for variations in the voltage provided by the vehicle energy source to produce a system having an accuracy of about 2 percent over a vehicle speed range up to 100 m.p.h. and with source voltage variations of 10–20 volts. Other diodes compensate the circuitry for temperature variations.

3,613,820

ELECTRONIC CIRCUITRY FOR VEHICLE SPEED RESPONSIVE SYSTEM

BACKGROUND OF THE INVENTION

Legislated exhaust emission standards have necessitated the use of various vehicle equipment that is actuated at predetermined vehicle speeds. Thus ignition-timing equipment that advances or retards ignition timing according to vehicle speed beyond those modifications obtainable by ordinary manifold pressure and centrifugal mechanisms has been incorporated into many modern engines. Other systems that position the throttle blade or permit recirculation of exhaust gases according to vehicle speed also are being considered. In addition to such emission control equipment, systems designed to improve the safety or convenience of the passengers by locking the vehicle doors above a predetermined vehicle speed, actuating speed-warning lights, or limiting maximum vehicle speed are in use or under consideration.

Equipment dealing with engine functions typically has obtained its actuating signal from the intake manifold pressure of the engine or from centrifugal mechanisms responding to engine speed. These parameters are somewhat representative of vehicle speed in a limited range of operating conditions but produce considerable inaccuracies during overall vehicle operation. More stringent emission control necessitates increased overall accuracy of such engine equipment, and greater accuracy also is desirable for the proposed safety and convenience equipment.

SUMMARY OF THE INVENTION

This invention provides an electronic converter and actuating circuit for use in a system for controlling vehicle equipment as a function of vehicle speed that is highly accurate, relatively insensitive to temperature and voltage variations encountered by the vehicle electrical systems and has relatively low cost. The system comprises an electrical signal generator connected mechanically to a vehicle wheel so wheel rotation drives the generator to produce an alternating signal having a frequency representative of vehicle speed. The electronic circuitry is connected to the output of the signal generator and comprises an electronic converter coupled to the signal generator for converting the frequency of the signal into a voltage having a value proportional to the frequency. An electronic switch having an input terminal coupled to the converter and an output terminal coupled to the vehicle equipment responds to a predetermined voltage at its input terminal to control actuation of the vehicle equipment.

The electronic circuitry is operated by the vehicle source of electrical energy and typically is subjected to considerable variations in the line voltage. A circuit for compensating the switch for such variations in the line voltage preferably is coupled to a second input terminal of the switch in a manner that cancels out the variations. In a typical system, the switch comprises a Schmitt trigger made up of two transistors in which the first transistor has its base terminal connected to the output of the converter and the second transistor has its output terminals coupled to the vehicle equipment. A compensating circuit that provides excellent compensation for source voltages varying between 10 and 20 volts for a Schmitt trigger of this type includes a voltage reference diode connecting the base terminal of the second transistor to the source of electrical energy. The voltage reference diode is connected to respond to an increase in the source voltage to raise the signal level necessary to actuate the trigger in direct proportion to increases in the signal level caused by the increased source voltage. Thus the effects of increasing or decreasing source voltages are canceled in the trigger circuit.

A small alternator connected into the conventional speedometer cable can be used as the signal generator. The alternator comprises a permanent magnet rotor mounted inside an annular bobbin containing a stator winding. Ferromagnetic pole pieces snap on to each side of the bobbin and have projecting fingers that mesh with each other to form a plurality of poles on the radially inner surface of the bobbin.

DETAILED DESCRIPTION

Figure 1:
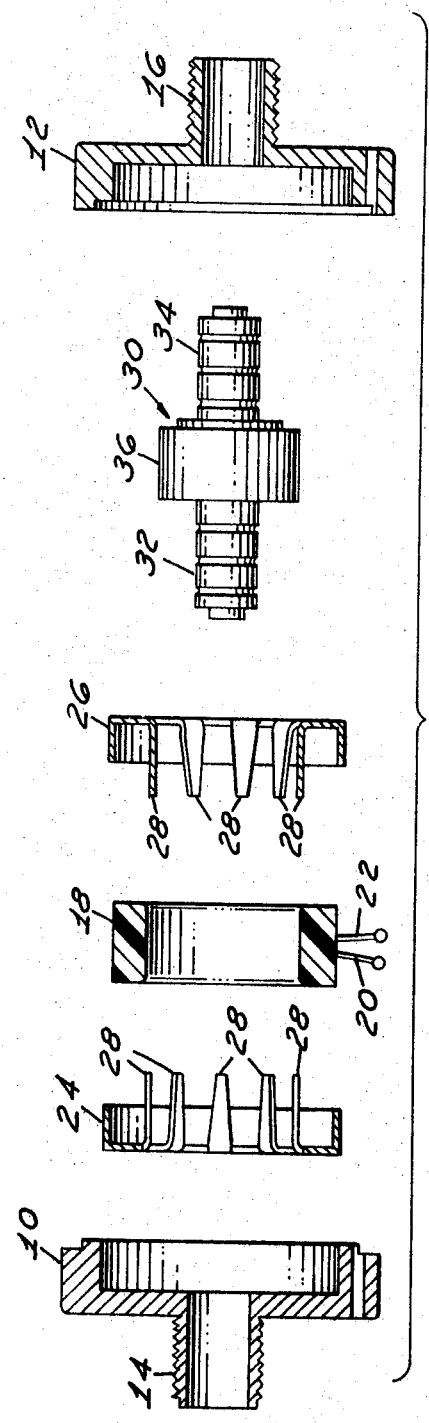
FIG. 1 is an exploded view of an alternator useful as the signal generator of this invention.

Referring to FIG. 1, the signal generator comprises two housing halves 10 and 12. Each housing half has an exterior ferrule 14, 16 and each ferrule is threaded for connection to the conventional vehicle speedometer cable (not shown). An annular bobbin 18 adapted for positioning within housing halves 10 and 12 comprises a winding encapsulated in a polymeric material. The winding leads 20 and 22 are brought outside of the housing halves through appropriate holes (not shown). A pair of pole pieces 24 and 26 are shaped to fit over the axial ends of bobbin 18. Each pole piece has a plurality of inwardly projecting fingers 28 that fit against the inner cylindrical surface of bobbin 18. The pole pieces are made of a ferromagnetic material such as cold rolled steel.

A rotor 30 has cylindrical bearing portions 32 and 34 on each side of a permanent magnet portion 36. The bearing portions are located within the passages formed in ferrules 14 and 16 and the permanent magnet portion is located within bobbin 18 when the signal generator is assembled. Magnet portion 36 preferably is made of a ceramic material that has been magnetized to form a plurality of poles on its exterior surface. Bearing portions 32 and 34 are made of a polymeric material that is injection molded into the magnet portion. In a typical signal generator, magnet portion 36 is about 1 inch in diameter and contains about 16 poles equally spaced around its cylindrical surface.

Figure 2:
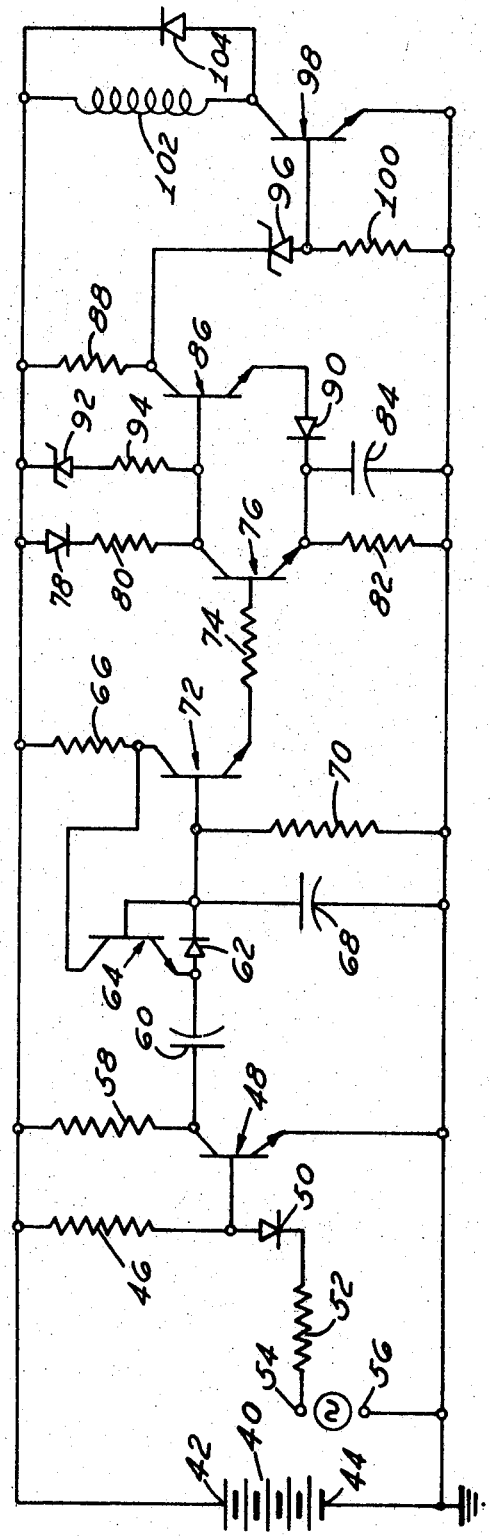
FIG. 2 is a schematic of an electronic circuit for converting the output of the alternator into a signal that applies the source of electrical energy across a solenoid capable of actuating an item of vehicle equipment.

Turning to FIG. 2, the vehicle battery 40 has a positive terminal 42 and a negative terminal 44 connected to ground. Battery 40 is supplied by a conventional vehicle alternator (not shown) and the battery in turn supplies electrical energy to the other vehicle electrical systems (not shown). In the circuitry of the system of this invention, a resistor 46 connects positive terminal 42 to the base of an NPN transistor 48. A diode 50 has its anode connected to the base of transistor 48 and its cathode connected through a resistor 52 to a signal generator terminal 54. Leads 20 and 22 of the signal generator are connected respectively to terminal 54 and to a terminal 56 connected to the negative plate 44 of battery 40.

A resistor 58 connects positive terminal 42 with the collector of transistor 48, and the emitter of transistor 48 is connected to negative terminal 44. A capacitor 60 connects the collector of transistor 48 to the anode of a diode 62 that has its cathode connected to the base of an NPN transistor 64. The collector of transistor 64 is connected through a resistor 66 to the positive terminal of the battery and the emitter of transistor 64 is connected to the anode of diode 62. A capacitor 68 in parallel with resistor 70 connect the cathode of diode 62 to negative terminal 44.

An NPN-transistor 72 has its base connected to the cathode of diode 62 and its collector connected to the collector of transistor 64. The emitter of transistor 72 is connected through a resistor 74 to the base of an NPN transistor 76. A diode 78 has its anode connected to the positive battery terminal and its cathode connected through a resistor 80 to the collector of transistor 76. The emitter of transistor 76 is connected through a resistor 82 in parallel with a capacitor 84 to the negative terminal of the battery.

The collector of transistor 76 is connected to the base of an NPN transistor 86. A resistor 88 connects the collector of transistor 86 to the positive terminal of the battery and a diode 90 has its anode connected to the emitter of transistor 86 and its cathode connected to the emitter of transistor 76. The cathode of zener diode 92 is connected to the positive battery terminal and the anode of diode 92 is connected through a resistor 94 to the base terminal of transistor 86.

A zener diode 96 has its cathode connected to the collector of transistor 86 and its anode connected to the base of an NPN transistor 98. A resistor 100 connects the base of transistor 98 to ground. A solenoid winding 102 in parallel with a reverse biased diode 104 connect the positive battery terminal to the collector of transistor 98. The emitter of transistor 98 is connected to the negative terminal of the battery.

Typical values and types of the components used in the FIG. 2 circuit with a conventional 12-volt battery 40 are: resistor 46, 47 k. ohms; diodes 50, 62, 78, 90 and 104, type 1N4001; resistor 52, 820 ohms; resistor 58, 2.2 k. ohms; transistors 48, 64, 72, 76 and 86, type 2N3904; capacitor 60, 0.15 microfarads; diode 62, 1N4001; capacitors 68 and 84, 10 microfarads at 25 volts; resistor 70, 44 k. ohms; resistor 66, 100 ohms; resistor 74, 2.2 k. ohms; resistor 80, 4.7 k. ohms; resistor 82, 470 ohms; resistors 88 and 94, 1.5 k. ohms; zener diode 92, type 1N4737; zener diode 96, type 1N4738; transistor 98, type NPS 6531; and resistor 100, 6.8 k. ohms.

When the vehicle containing the control system is at rest and no signal is applied to terminals 54 and 56 by the signal generator, transistor 48 is biased into a conducting condition. Transistor 64 is not conducting and both plates of capacitor 68 are at ground potential. Transistor 72 is connected in an emitter follower configuration and it also is nonconducting so that no potential is applied to the base of transistor 76. Voltage is applied to the base of transistor 86 through diode 78 and resistor 80 to bias transistor 86 into the conducting state. A relatively low voltage appears at the collector of transistor 86 and this voltage is blocked from the base of transistor 98 by zener diode 96. Transistor 98 thus also is in a nonconducting state.

When the vehicle begins moving each negative portion of the AC signal produced across terminals 54 and 56 by the signal generator reduces the voltage on the base of transistor 48 to switch transistor 48 into nonconduction. This nonconduction raises the potential at the collector of transistor 48 to charge capacitor 60 and place a unit charge in capacitor 68. Capacitor 68 attains a charge that is proportional to the frequency of the alternating waveform produced by the signal generator.

Transistor 72 is biased into conduction by the charge on capacitor 68 when the charge exceeds a value predetermined by resistor 70. Transistor 76 then begins conducting and its conduction reduces the voltage at the base of transistor 86 which switches transistor 86 into a nonconducting state. The voltage at the collector of transistor 86 rises toward the voltage of battery 40 and this voltage is applied to the base of transistor 98 to switch transistor 98 into conduction, thereby connecting the battery across solenoid winding 102.

Voltage reference diode 92 conducts when the voltage drop across the diode exceeds about 7.5 volts. Because of the other resistances in the circuit of diode 92, the diode is at the threshold of conduction at the minimum operating battery voltage of about 10 volts. Any increase in the voltage across battery 40 resulting, for example, from the operation of the vehicle alternator (not shown) produces a proportionately higher charge on capacitor 68 which tends to turn on transistor 76 at a lower speed. Diode 92 counteracts this tendency by applying virtually all of the voltage increase to the collector of transistor 76 and the base of transistor 86. Transistor 76 then requires a higher voltage at its base terminal to switch the transistor into conduction in proportion to the higher charge on capacitor 68 and thereby compensates the switching point for the increased source voltage. Good compensation is achieved at minimal expense for voltages ranging up to about 20 volts.

When transistor 86 is conducting, diode 96 blocks any voltage appearing at the collector of transistor 86 from reaching the base of transistor 98. As transistor 86 turns off, diode 96 applies the increased voltage at the collector of transistor 86 to the base of transistor 98 to turn on transistor 98. The presence of diode 96 thus provides cooler operation of transistor 98 and also provides a sharp switching point for transistor 98. Diodes 50 and 78 compensate the base-emitter terminals of transistors 48 and 86 respectively for the effects of temperature changes. Good compensation is achieved for temperatures ranging from about −30° to +175° F.

The solenoid actuated by winding 102 is used with numerous items of vehicle equipment. In an ignition-timing system, for example, the solenoid is coupled to a vacuum motor that blocks the distributor advance signal obtained from a carburetor spark port until actuation at the predetermined vehicle speed of about 20 m.p.h. and permits normal advance above the predetermined speed. The solenoid also can be used in a throttle modulator system in which the solenoid is actuated to open slightly the throttle blade during decelerations above a predetermined speed and is deactuated below that speed. Door-locking mechanisms that are operated by solenoid actuation above vehicle speeds of about 8 m.p.h. also can be actuated by a solenoid. The solenoid can be replaced by speed warning lights that are lighted when vehicle speed exceeds predetermined values.

Figure 3:
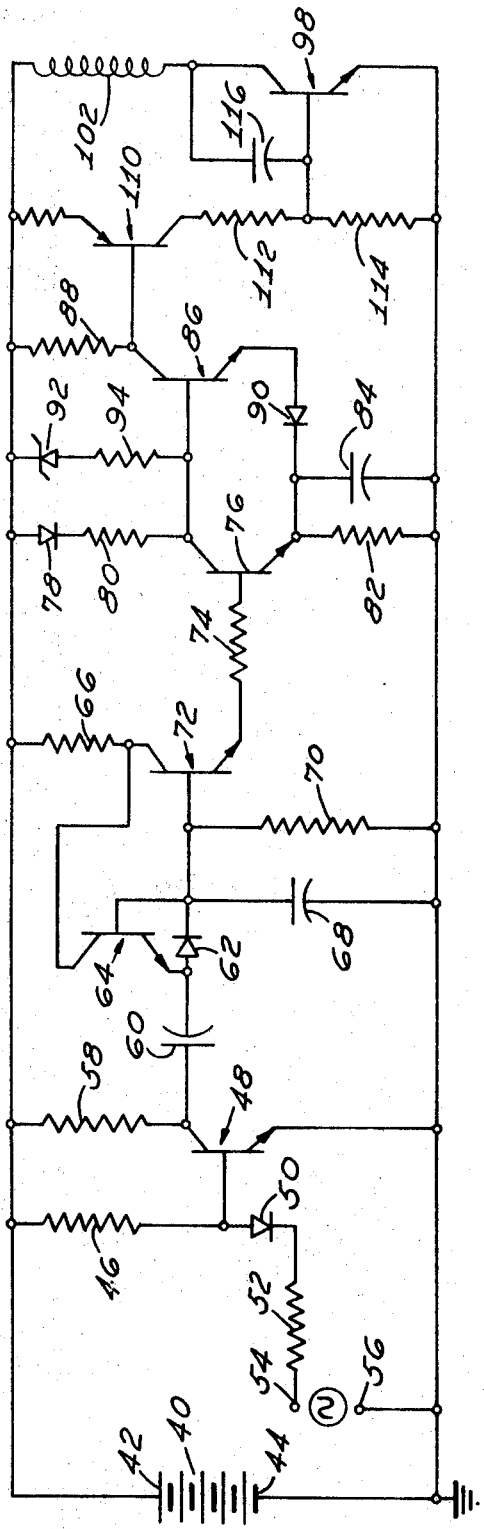
FIG. 3 is a schematic similar to FIG. 2 but providing fail safe operation of the vehicle equipment.

Some of these applications, particularly the ignition-timing system, seriously compromise vehicle operation in the event of system failure. The fail-safe circuit of FIG. 3 prevents such compromises by providing normal vehicle operation in the event of the most probable type of system failure. In FIG. 3, circuitry to the left of the output terminals of transistor 86 is identical to the FIG. 2 circuit. The collector of transistor 86 is connected to the base of a PNP transistor 110 which has its emitter connected to the positive terminal of the battery. A resistor 112 connects the collector of transistor 110 to the base of transistor 98, and another resistor 114 connects the base of transistor 98 to the negative battery terminal. The base and collector terminals of transistor 98 are connected by a capacitor 116 and diode 104 is delected.

When the vehicle containing the FIG. 3 circuit is at rest, conduction of transistor 86 turns on transistor 110 which in turn switches transistor 98 into conduction. Solenoid 102 is connected across the battery and the solenoid actuates its associated equipment. As vehicle speed passes the predetermined set point, transistor 86 turns off, which turns off transistors 110 and 98 to disconnect the solenoid from the battery. The vacuum motor operated by solenoid 102 normally connects the carburetor spark port with the distributor advance mechanism and actuation of the solenoid interrupts the connection. Normal vehicle operation thus is provided in the event of failure of the circuit.

Thus this invention provides a control system for actuating vehicle equipment according to vehicle speed that is relatively insensitive to the temperature and voltage variations encountered in most vehicles. The system is relatively inexpensive and can be used for any of a variety of items of vehicle equipment.

Claimed is:

1. A system for controlling vehicle equipment as a function of vehicle speed comprising
    a source of electrical energy,
    an electrical signal generator connected mechanically to a vehicle wheel, said signal generator producing an alternating signal having a frequency representative of vehicle speed,
    electronic circuit means for actuating said vehicle equipment when a predetermined vehicle speed is attained, said circuit means comprising converter means coupled to said signal generator, said converter means converting the frequency of the signal from said signal generator into a voltage having a value proportional to said frequency, and
    switch means having a first input terminal coupled to said converter means, an output terminal coupled to said vehicle equipment, and a second input terminal, said switch means being actuated to apply said source of electrical energy to said vehicle equipment when the voltage at said first input terminal exceeds a predetermined value, said switch means including voltage compensating means for compensating said switch means for variations in the voltage of said source of electrical energy, said voltage compensating means comprising means coupling said second input terminal to said source of electrical energy for applying variations in the voltage of said source to said switch means.

2. The system of claim 1 in which the compensating means comprises a voltage reference diode connecting said second input terminal to the source of electrical energy, said diode being biased to the threshold of conduction at the minimum operating voltage of the source and increasing conduction at voltage above the minimum.

3. The system of claim 2 in which the output terminal of the switch means is connected to a switching transistor, said switching transistor being in series with a solenoid winding, said switching transistor being normally nonconducting and being switched into conduction when vehicle speed exceeds a predetermined value.

4. A system for controlling vehicle equipment as a function of vehicle speed comprising
   a source of electrical energy,
   an electrical signal generator connected mechanically to a vehicle wheel, said signal generator producing an alternating signal having a frequency representative of vehicle speed,
   electronic circuit means for actuating said vehicle equipment when a predetermined vehicle speed is attained, said circuit means comprising converter means coupled to said signal generator, said converter means converting the frequency of the signal from said signal generator into a voltage having a value proportional to said frequency,
   switch means having a first input terminal coupled to said converter means and an output terminal coupled to said vehicle equipment, said switch means being actuated to apply said source of electrical energy to said vehicle equipment when the voltage at said input terminal exceeds a predetermined value, said switch means including voltage-compensating means for variations in the voltage of said source of electrical energy, and
   a switching transistor connected to the output terminal of the switch means, said switching transistor being in series with a solenoid winding, said switching transistor being normally nonconduction and being switched into conduction when vehicle speed exceeds a predetermined value.